United States Patent
Zhang et al.

(10) Patent No.: US 9,447,865 B2
(45) Date of Patent: Sep. 20, 2016

(54) TRANSMISSION OPERATING MECHANISM

(71) Applicant: Shaanxi Fast Gear Co., Ltd., Shaanxi (CN)

(72) Inventors: Fayong Zhang, Shaanxi (CN); Lingli Li, Shaanxi (CN); Chongyi Yin, Shaanxi (CN); Guojie Xu, Shaanxi (CN)

(73) Assignee: SHAANXI FAST GEAR CO., LTD., Shaanxi (CN)

( * ) Notice: Subject to any disclaimer, the term of this patent is extended or adjusted under 35 U.S.C. 154(b) by 0 days.

(21) Appl. No.: 14/394,609

(22) PCT Filed: Jun. 24, 2013

(86) PCT No.: PCT/CN2013/077761
§ 371 (c)(1),
(2) Date: Oct. 15, 2014

(87) PCT Pub. No.: WO2014/048145
PCT Pub. Date: Apr. 3, 2014

(65) Prior Publication Data
US 2015/0211626 A1 Jul. 30, 2015

(30) Foreign Application Priority Data
Sep. 27, 2012 (CN) ...................... 2012 2 0499293 U

(51) Int. Cl.
*F16H 59/02* (2006.01)
*F16H 63/20* (2006.01)
*F16H 63/30* (2006.01)

(52) U.S. Cl.
CPC .............. *F16H 59/02* (2013.01); *F16H 63/20* (2013.01); *F16H 63/30* (2013.01); *F16H 2059/026* (2013.01); *F16H 2063/3076* (2013.01); *Y10T 74/20177* (2015.01)

(58) Field of Classification Search
CPC ................. F16H 48/295; F16H 48/32; F16H 2048/343; F16H 2704/04; F16H 2710/10; F16H 2710/16; F16H 2710/18; F16H 2710/20; F16H 59/02; F16H 59/213; F16H 59/044; F16H 59/045; F16H 59/10; F16H 59/105; F16H 2059/0221; F16H 2059/026; F16H 61/0003; F16H 61/0009; F16H 2061/242; F16H 2061/243; F16H 2061/245; F16H 2061/247; F16H 2063/3073; F16H 2063/3076; F16H 2063/3079; F16H 2063/3086; F16H 2063/3089; F16H 63/04; F16H 63/08; F16H 63/10; F16H 63/12; F16H 63/20; F16H 63/206; F16H 63/22; F16H 63/24; F16H 63/28; F16H 63/30; F16H 63/36; F16H 63/38; F16H 63/3013; F16H 63/3023; F16H 63/3069; Y10T 16/529; Y10T 16/5321; Y10T 16/5323; Y10T 16/5324; Y10T 16/53247; Y10T 16/53257; Y10T 70/5934; Y10T 74/20085; Y10T 74/20104; Y10T 74/2011; Y10T 74/20116; Y10T 74/20128; Y10T 74/20152; Y10T 74/20159; Y10T 74/20171; Y10T 74/20177
USPC .............. 74/346, 335, 471 R, 473.1, 473.11, 74/473.2, 473.21, 473.24, 473.25, 473.26, 74/473.28, 473.32, 473.33, 473.36
See application file for complete search history.

(56) References Cited

U.S. PATENT DOCUMENTS

| 4,275,612 | A | * | 6/1981 | Silvester | ................. F16H 61/24 477/99 |
| 4,377,951 | A | * | 3/1983 | Magg | ..................... F16H 61/24 74/473.28 |

(Continued)

FOREIGN PATENT DOCUMENTS

| CN | 2842101 Y | 11/2006 |
| CN | 101936390 A | 1/2011 |

(Continued)

*Primary Examiner* — William Kelleher
*Assistant Examiner* — Leonard J Archuleta
(74) *Attorney, Agent, or Firm* — Frommer Lawrence & Haug LLP

(57) ABSTRACT

A transmission operating mechanism includes an operating housing, wherein an inner shifting shaft is provided in the operating housing, and the operating housing is provided with, from left to right, a first position-limiting structure installation hole, a shifting block installation cavity, a second position-limiting structure installation hole and a balancing spring installation cavity; and a shifting block is installed in the shifting block installation cavity and is connected to the inner shifting shaft via a shifting block positioning pin. The spatial position of the operating housing is fully utilized to effectively arrange each functional component, and the requirement for modification is fully considered within the limited dimensional range. Therefore, various operation modes may be achieved by simply providing several modified parts without changing the operating housing.

9 Claims, 6 Drawing Sheets

(56) References Cited

U.S. PATENT DOCUMENTS

| | | | | | |
|---|---|---|---|---|---|
| 4,455,883 | A | * | 6/1984 | Radcliffe | F16H 59/044 74/473.21 |
| 4,476,739 | A | * | 10/1984 | Arai | F16H 63/20 74/473.26 |
| 4,539,859 | A | * | 9/1985 | Arai | F16H 61/24 74/473.27 |
| 4,569,247 | A | * | 2/1986 | Inui | F16H 63/20 74/473.27 |
| 4,944,197 | A | * | 7/1990 | Stine | F16H 63/36 74/473.26 |
| 4,974,468 | A | * | 12/1990 | Reynolds | F16H 63/44 74/473.19 |
| 5,000,060 | A | * | 3/1991 | Reynolds | F16H 63/34 74/331 |
| 5,183,132 | A | * | 2/1993 | Fujisawa | B60K 17/35 180/247 |
| 5,850,760 | A | * | 12/1998 | Jin | F16H 61/30 74/388 R |
| 5,852,952 | A | * | 12/1998 | Okamoto | F16H 61/30 188/322.16 |
| 6,000,294 | A | * | 12/1999 | Jackson | F16H 61/30 74/335 |
| 6,165,103 | A | * | 12/2000 | Tenzor | B60K 17/046 192/108 |
| 6,257,084 | B1 | * | 7/2001 | Yoshina | F16H 63/36 74/359 |
| 6,722,218 | B1 | * | 4/2004 | Fischer | F16H 63/30 74/335 |
| 6,732,607 | B2 | * | 5/2004 | Yamamoto | F16H 61/32 335/266 |
| 6,792,821 | B1 | * | 9/2004 | Yamamoto | F16H 61/32 335/256 |
| 6,810,762 | B2 | * | 11/2004 | Suzuki | F16H 61/32 74/335 |
| 6,892,601 | B2 | * | 5/2005 | Suzuki | F16H 61/32 74/335 |
| 7,104,150 | B2 | * | 9/2006 | Ito | F16H 59/70 192/30 W |
| 8,578,809 | B2 | * | 11/2013 | Spaeth | F16H 61/30 74/473.11 |
| 2004/0099079 | A1 | * | 5/2004 | Fuhrer | F16H 3/38 74/473.25 |
| 2010/0011898 | A1 | * | 1/2010 | Eisenberger | F16H 61/24 74/473.24 |

FOREIGN PATENT DOCUMENTS

| | | |
|---|---|---|
| CN | 102494120 A | 6/2012 |
| CN | 202834027 U | 3/2013 |
| EP | 1 450 073 A | 8/2004 |
| JP | 58-106257 A | 6/1983 |

\* cited by examiner

TRANSMISSION OPERATING MECHANISM

This application is a 371 of PCT/CN2013/077761 filed on Jun. 24, 2013 titled "Transmission Operating Mechanism" and published on Apr. 3, 2014 under publication number WO 2014/048145 A1 and which claims the benefit of priority to Chinese Patent Application No. 201220499293.9, titled "TRANSMISSION OPERATING MECHANISM", filed with the Chinese State Intellectual Property Office on Sep. 27, 2012, the entire disclosures of both applications are incorporated herein by reference.

TECHNICAL FIELD

The present application relates to the technical field of automobile transmissions, and particularly to a transmission operating mechanism.

BACKGROUND

Currently, there are various gear shifting operating modes in the automobile market, especially in the commercial automobile market, such as single-lever single-H left operation, single-lever single-H right operation, single-lever double-H left operation, single-lever double-H right operation, double-lever single-H left operation, double-lever single-H right operation, double-lever double-H left operation, and double-lever double-H right operation. Also, operating modes having a gear shifting booster are widely existed in the market. For realizing operating modes of various vehicle types, many peripheral modified parts are required to match with the transmission, which causes difficulties in storage and manufacture management of peripheral connection parts. Therefore, many enterprises are looking for a reasonable operating mode, which may reduce the modification design, the number of parts, and the costs for production and storage management as much as possible.

SUMMARY

An object of the present application is to provide a transmission operating mechanism to solve the above technical problems.

To achieve the above object, the following technical solutions are provided according to the present application.

A transmission operating mechanism includes an operating housing, wherein an inner shifting shaft is provided in the operating housing, and the operating housing is provided with, from left to right, a first position-limiting structure installation hole, a shifting block installation cavity, a second position-limiting structure installation hole and a balancing spring installation cavity; and a shifting block is installed in the shifting block installation cavity and is connected to the inner shifting shaft via a shifting block positioning pin.

According to a further improvement of the present application, the inner shifting shaft protrudes out of a left end of the operating housing to be fixedly connected to the outer shifting arm, and a sealing member for sealing the spring installation cavity is installed at a right end of the operating housing; or the inner shifting shaft protrudes out of a right end of the operating housing to be fixedly connected to the outer shifting arm, and a sealing member is installed at a left end of the operating housing.

According to a further improvement of the present application, a booster installation cavity located in the operating housing is provided at a left side of the first position-limiting structure installation hole; an outer shifting shaft is sleeved on the inner shifting shaft; a booster outer-shaft shifting block and a booster inner-shaft shifting block are installed in the booster installation cavity; the booster inner-shaft shifting block is connected to the inner shifting shaft via a pin shaft; the booster outer-shaft shifting block is fixedly connected to the outer shifting shaft; and the shifting block is connected to the outer shifting shaft and the inner shifting shaft via the positioning pin, and an interlocking block is sleeved on the outer shifting shaft.

According to a further improvement of the present application, the shifting shaft is provided with a first position-limiting protruding portion, a first pin is installed in each of the first position-limiting structure installation holes at an upper end and a lower end of the operating housing, and is retained in each of the first position-limiting structure installation holes via a first spring and a first thread plug, and a front end of the first pin cooperates with the first position-limiting protruding portion of the inner shifting shaft.

According to a further improvement of the present application, the inner shifting shaft is provided with a second position-limiting protruding portion, and a second pin is installed in the second position-limiting structure installation hole of the operating housing, and is retained in the second position-limiting structure installation hole via a second spring and a second bolt, and a front end of the second pin cooperates with the second position-limiting protruding portion of the inner shifting shaft.

According to a further improvement of the present application, a balancing spring configured to cooperate with the inner shifting shaft is installed in the balancing spring installation cavity.

According to a further improvement of the present application, an outer wall of the outer shifting shaft is provided with a groove, and a position-limiting steel ball roller is installed in the operating housing via a third spring and a third thread plug and is protruding into the groove in the outer wall of the outer shifting shaft.

With respect to the conventional technology, the present application has the following advantages. According to the present application, the spatial position of the operating housing is fully utilized to effectively arrange each functional component, and the requirement for modification is fully considered within the limited dimensional range, therefore, various operation modes may be achieved by simply providing several modified parts without changing the operating housing. Such structure may be used in various operation modes, such as single-lever operation, double-lever operation, single-H operation, double-H operation, left operation, right operation, operation with a booster or without a booster, and any combination thereof, therefore, the number of the modified parts is effectively reduced, which reduces costs for manufacture and storage, and avoids the mis-installation phenomenon caused by excessive peripheral parts.

DETAILED DESCRIPTION

Figure 1:
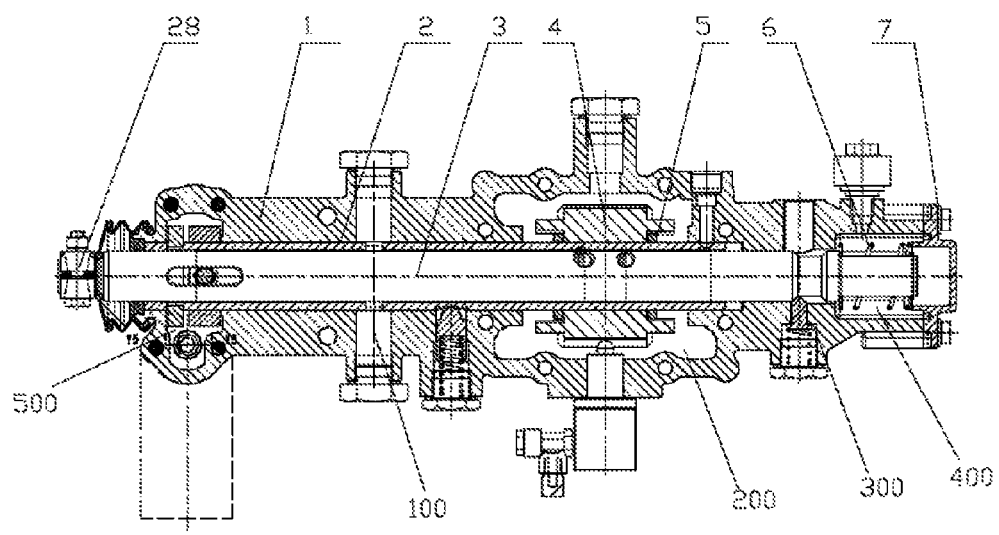
FIG. 1 is a schematic view showing the structure of an embodiment of the present application.
Figure 2:
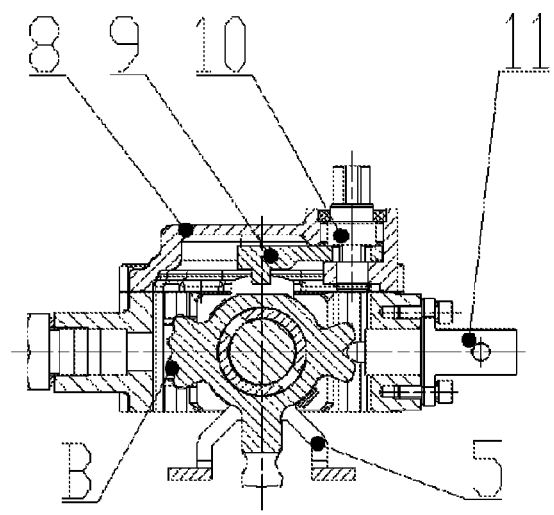
FIG. 2 is a sectional view of a shifting block in FIG. 1.
Figure 3:
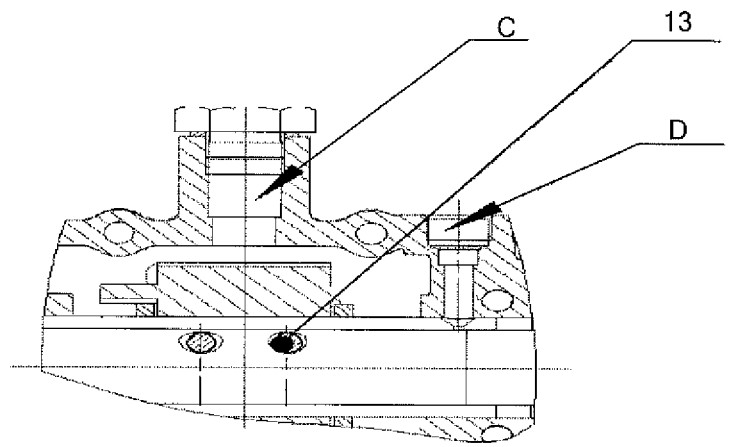
FIG. 3 is a partial view of the shifting block in FIG. 1.

The present application is further described in detail hereinafter in conjunction with the accompanying drawings.

Reference is made to FIGS. 1 to 13. A transmission operating mechanism according to the present application includes an operating housing 1, an outer shifting shaft 2, an inner shifting shaft 3, a shifting block 4, an interlocking block 5, a balancing spring 6, an end cap 7, an operating window cover 8, a gear-selecting shifting block 9, a gear-selecting shaft 10, an air valve 11, a shifting block positioning pin 13, a positioning steel ball roller 14, a booster outer-shaft shifting block 22, a booster inner-shaft shifting block 23, a pin shaft 24 and an outer shifting arm 28.

The outer shifting arm 28 is connected to the inner shifting shaft 3 by splines or in a fixed connection. The booster inner-shaft shifting block 23 is connected to the inner shifting shaft 3 via a pin shaft 24. The booster outer-shaft shifting block 22 and the outer shifting shaft 2 are connected in a fixed connection, or are fixed by other connection manners, such as pin connection. The shifting block 4 and the interlocking block 5 are sleeved on the outer shifting shaft 2, the shifting block 4 is connected to the outer shifting shaft 2 and inner shifting shaft 3 via the shifting block positioning pin 13, and a small clearance is provided between the shifting block positioning pin 13 and a connecting hole in the inner shifting shaft 3 for connecting the shifting block positioning pin 13. The operating housing 1 is provided with a booster installation cavity 500, a first position-limiting structure installation hole 100, a shifting block installation cavity 200, a second position-limiting structure installation hole 300 and a balancing spring installation cavity 400 sequentially from left to right.

A solution of a single-H left operation with a booster is shown in FIG. 1, which may be employed in single-lever operation or double-lever operation. In single-lever operation, the outer shifting arm 28 drives the inner shifting shaft 3 and the shifting block 4 to move rightward or leftward to select a gear position, and the outer shifting arm 28 drives the inner shifting shaft 3 to rotate to shift gear. In double-lever operation, the gear-selecting shaft 10 rotates to drive the gear-selecting shifting block 9 to rotate, which further drives the shifting block 4 and the inner shifting shaft 3 to move rightward or leftward to select a gear position, and the outer shifting arm 28 drives the inner shifting shaft 3 to rotate to shift gear. During the gear shifting operation, the outer shifting arm 28 rotates together with the inner shifting shaft 3, the inner shifting shaft 3 drives the booster inner-shaft shifting block 23 to rotate via the pin shaft 24, a valve of the booster is opened by the rotation of the booster inner-shaft shifting block, and under the action of air pressure, a cylinder piston of the booster pushes the booster outer-shaft shifting block 22 to rotate. Since the booster outer-shaft shifting block 22 is fixedly connected to the outer shifting shaft 2, the outer shifting shaft 2 is driven to rotate, which further drives the shifting block 4 to rotate via the shifting block positioning pin 13 provided in a hole or a groove of the outer shifting shaft 2, and a guiding block in the transmission is pushed by the shifting block 4 to move, thereby finishing the gear shifting operation. During the gear shifting operation, the interlocking block 5 does not rotate, and the relative position between the interlocking block 5 and the shifting block 4 is fixed, only the guiding block corresponding to the shifting block 4 is allowed to be pushed, and other guiding blocks are not allowed to move, which avoids the possibility of two gears are engaged simultaneously.

Figure 4:
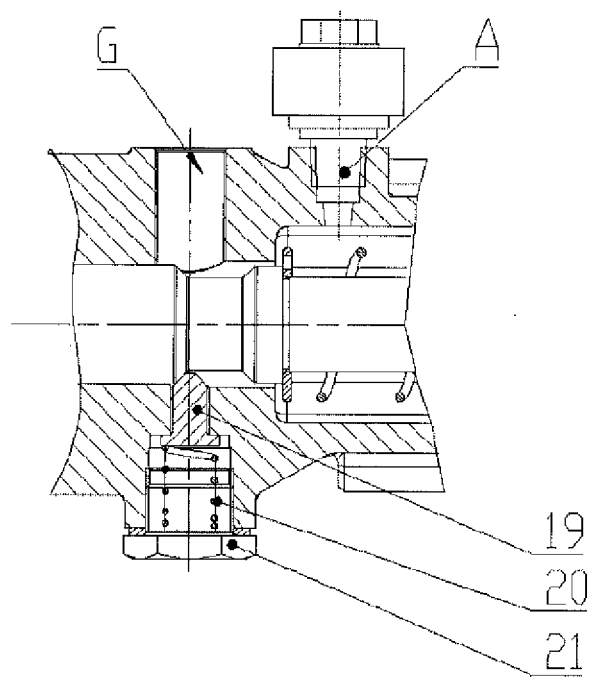
FIG. 4 is partial view of a right end of FIG. 1.

Reference is made to FIG. 4. The inner shifting shaft 3 is provided with a second position-limiting protruding portion, and a second pin 19 is installed in the second position-limiting structure installation hole of the operating housing 1, and is retained in the second position-limiting structure installation hole via a second spring 20 and a second bolt 21, and a front end of the second pin 19 cooperates with the second position-limiting protruding portion of the inner shifting shaft 3.

Figure 10:
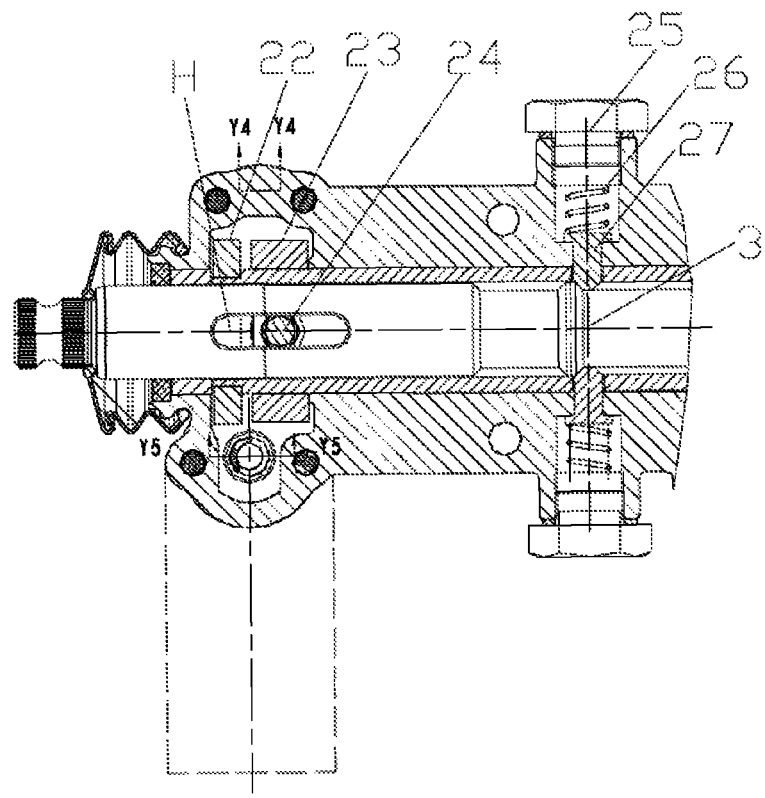
FIG. 10 is a schematic view showing the structure of another embodiment with a booster according to the present application.
Figure 13:
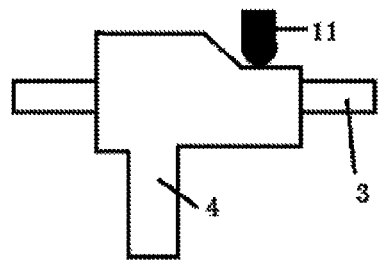
FIG. 13 is a schematic view showing the cooperation between the shifting block and an air valve under a double-H operation mode.

As shown in FIG. 1, the inner shifting shaft 3 is machined to form a first position-limiting protruding portion, and two position-limiting structures, each including a first spring 26, a first pin 27 and a first thread plug 25, are provided at an upper end and a lower end of the operating housing 1 respectively, thereby realizing the double-H operation. The first pin 27 is installed in the first position-limiting structure installation hole of the operating housing 1, and is retained at this position via the first spring 26 and the first thread plug 25, and a front end of the first pin 27 cooperates with the first position-limiting protruding portion of the inner shifting shaft 3. As shown in FIG. 10, the double-H operation has two neutral gear positions (a first neutral gear position is shown in the figure). When the operating lever is in the first neutral gear position, the second neutral gear position may be reached by moving the operating lever rightwards, and at this time, the first pin 27 will be limited at the left side of the position-limiting protruding portion of the inner shifting shaft 3, and the pressing down and springing up of the first pin 27 may provide a haptic feedback to the driver. The haptic feedback of shifting from the second neutral gear position to the first neutral gear position is provided in the same way as the above manner. When the operating lever shifts from the first neutral gear position to the second neutral gear position, as shown in FIG. 13, the shifting block 4 sleeved on the inner shifting shaft 3 may squeeze or release the air valve 11, the air valve 11 controls an auxiliary transmission cylinder to shift the auxiliary transmission to a high-gear position or a low-gear position, and then the inner shifting shaft 3 is rotated, and the shifting block 4 shifts the shifting fork shaft to engage in one of the two gear positions which are respectively located two sides of the second neutral gear position. In the double-H operation, the shifting block 4 is provided with two steps, and the two steps are connected by a slope, and the two steps correspond to two neutral gear positions. The two steps cooperate with the air valve 11 to control whether or not to press down the air valve 11, so as to further shift the auxiliary transmission to a high-gear position or a low-gear position. The inner shifting shaft 3 moves rightwards or leftwards to drive the shifting block 4 to move rightwards or leftwards, and the state of the air valve 11 is changed by the two steps of the shifting block 4, thus, when the operating lever is located in each of the two neutral gear positions, the auxiliary transmission is at the high-gear position or the low-gear position correspondingly. Therefore, the double-H operation is realized.

Figure 5:
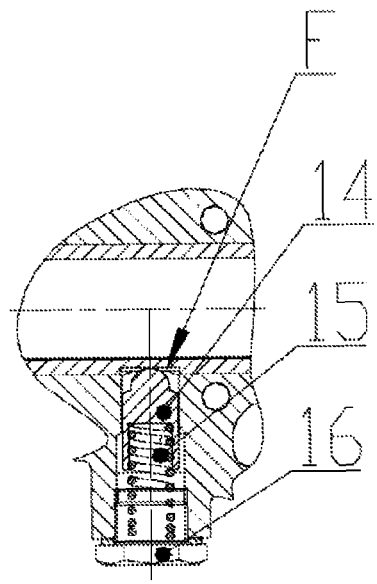
FIG. 5 is a partial view of a positioning ball roller in FIG. 1.

Reference is made to FIG. 5. An outer wall of the outer shifting shaft 2 is provided with a groove, and a position-limiting steel ball roller 14 is installed in the operating housing 1 via a third spring 15 and a third screw plug 16 and is protruding into the groove in the outer wall of the outer shifting shaft 2.

Figure 6:
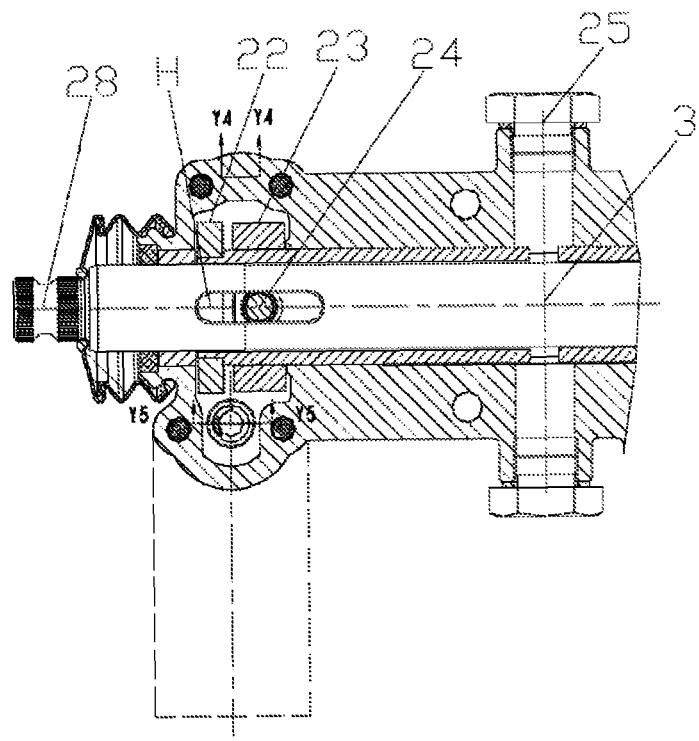
FIG. 6 is a partial view of a left end of FIG. 1.
Figure 7:
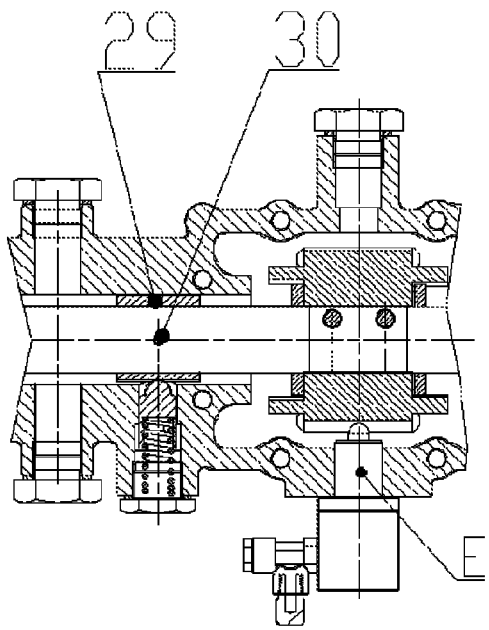
FIG. 7 is a schematic view showing the structure of another embodiment of the present application.
Figure 8:
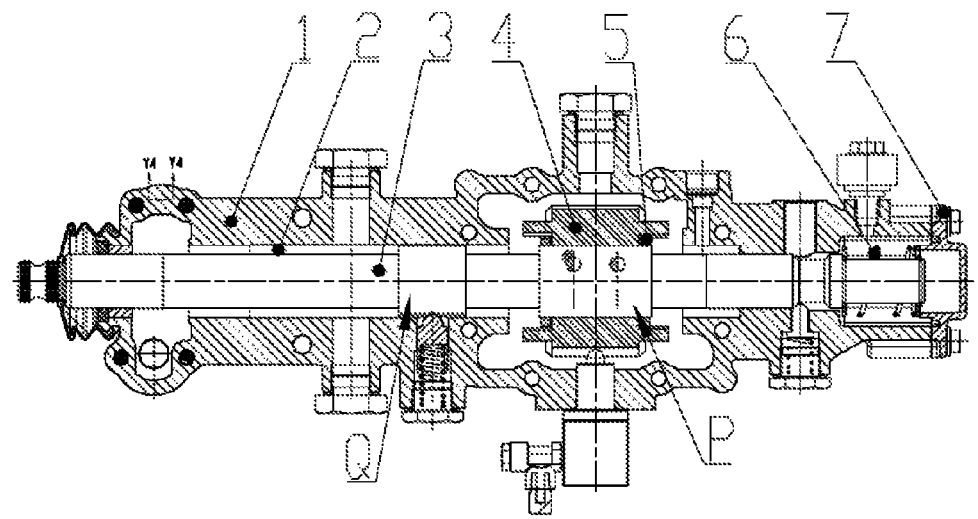
FIG. 8 is a schematic view showing the structure of another embodiment of the present application.
Figure 9:
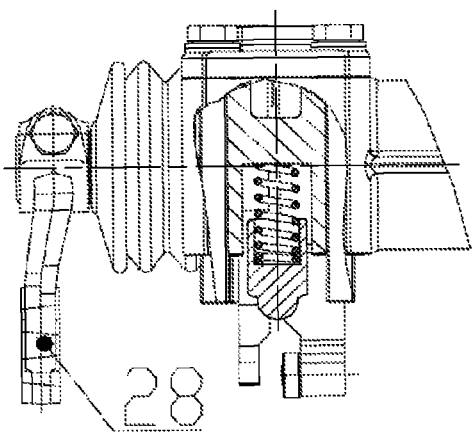
FIG. 9 is a sectional view taken along line Y5-Y5 in FIG. 1.
Figure 11:
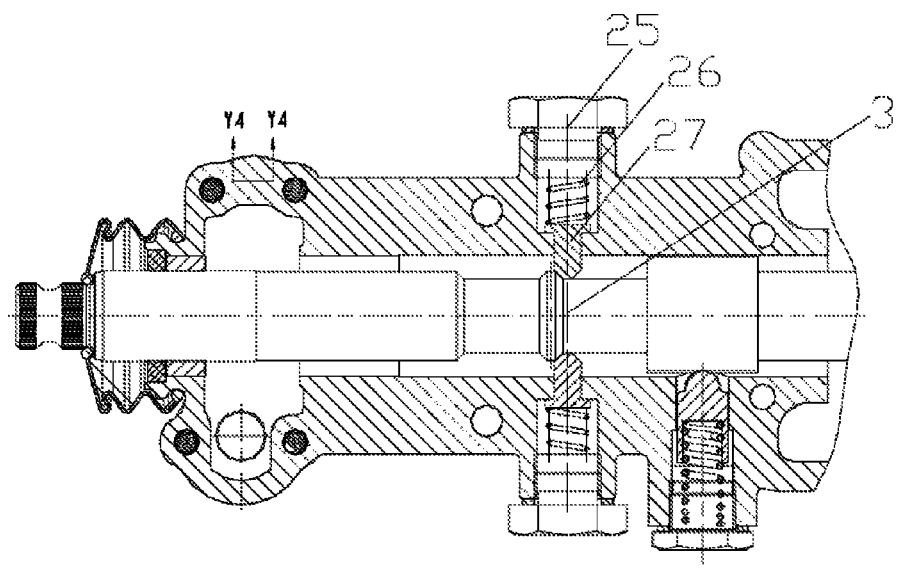
FIG. 11 is a schematic view showing the structure of another embodiment without the booster shown in FIG. 10 according to the present application.

In a solution, the part indicated by the dashed line in FIG. 6 is omitted, which includes the shifting booster, the booster inner-shaft shifting block 23, the booster outer-shaft shifting block 22, the pin shaft 24, and the outer shifting shaft 2, and a cover plate is provided to seal the joint surface for the booster, and the part P on the inner shifting shaft 3 for installing the shifting block 4 is thickened or a barrel type spacer bush is provided for fixing the shifting block 4. Further, a structure corresponding to the structure at part F in FIG. 5 is formed in the inner shifting shaft (see part Q in FIG. 8), or formed in a sleeve connected to the inner shifting shaft (see parts 29, 30 in FIG. 7), and in this way, the operation mode without a booster may be realized. The single-H operation or the double-H operation may both be realized by modifying partial structures of the shifting block 4 and the inner shifting shaft 3. Reference is made to FIGS. 7, 8 and 11. The gear selecting operation of the operation without a booster is the same as that of the operation mode with a booster. In the gear shifting operation, the outer shifting arm 28 drives the inner shifting shaft 3 to rotate, and the inner shifting shaft 3 drives the shifting block to rotate via the shifting block positioning pin, thereby finishing the gear shifting operation.

Figure 12:
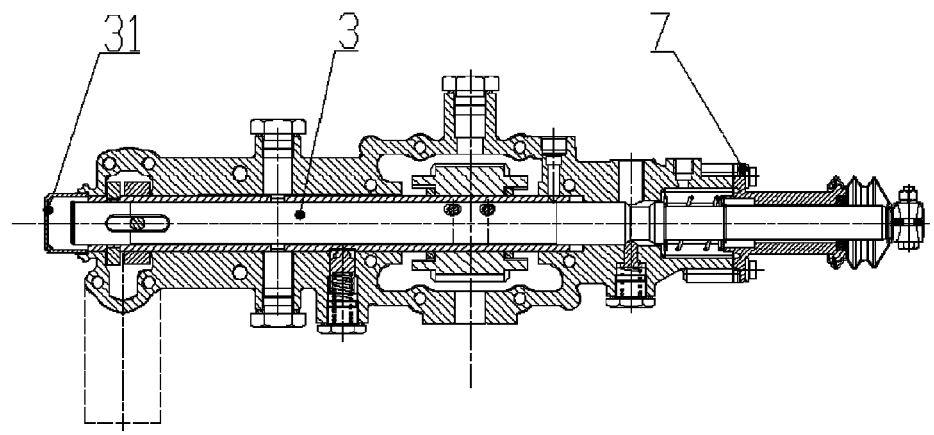
FIG. 12 is a schematic view showing the structure of the present application with an outer shifting arm being located at the right side.

As shown in FIG. 12, connecting splines of the inner shifting shaft are arranged at the right side of the inner shifting shaft by modifying the structure of the end cap at the right side, and a sealing member 31 is provided to seal an end surface of the operating housing at the left side, and in this way, the right operation modes may be realized, which include right operation with or without a booster, single-H or double-H right operation, and single-lever or double-lever right operation.

Reference is made to FIGS. 2 to 5. A spring and a steel ball roller are installed at part C to cooperate with part B of the shifting block, to realize a gear position self-locking function of the operating device without a shifting booster. A neutral gear detecting device may be installed in a neutral gear detecting device installation hole D, and a reverse gear detecting device may be installed in a reverse gear detecting device installation hole G, thereby monitoring the neutral gear and the reverse gear conditions of the whole automobile. A combination of a ball socket and an inclined surface is provided at part F, to provide a haptic feedback of the neutral gear, thus, when the operating mechanism is engaged in a neutral gear position, an obvious haptic feedback may be provided to the driver. A ventilation plug and an air valve are respectively disposed at part A and part E, and the ventilation plug is provided to meet the requirement of air pressure balance of the transmission, and the air valve is provided to realize the operating control of the transmission.

The invention claimed is:

1. A transmission operating mechanism, comprising an operating housing, wherein an inner shifting shaft is provided in the operating housing, and the operating housing is provided with, from left to right, a first position-limiting structure installation hole, a shifting block installation cavity, a second position-limiting structure installation hole and a balancing spring installation cavity; and a shifting block is installed in the shifting block installation cavity and is connected to the inner shifting shaft via a shifting block positioning pin, wherein a booster installation cavity located in the operating housing is provided at a left side of the first position-limiting structure installation hole; an outer shifting shaft is sleeved on the inner shifting shaft; a booster outer-shaft shifting block and a booster inner-shaft shifting block are installed in the booster installation cavity; the booster inner-shaft shifting block is connected to the inner shifting shaft via a pin shaft; the booster outer-shaft shifting block is fixedly connected to the outer shifting shaft; and the shifting block is connected to the outer shifting shaft and the inner shifting shaft via the positioning pin, and an interlocking block is sleeved on the outer shifting shaft.

2. The transmission operating mechanism according to claim 1, wherein the inner shifting shaft protrudes out of a left end of the operating housing to be fixedly connected to an outer shifting arm, and a sealing member for sealing the spring installation cavity is installed at a right end of the operating housing; or the inner shifting shaft protrudes out of a right end of the operating housing to be fixedly connected to the outer shifting arm, and a sealing member is installed at a left end of the operating housing.

3. The transmission operating mechanism according to claim 1, wherein the inner shifting shaft is provided with a first position-limiting protruding portion, a first pin is installed in each of the first position-limiting structure installation holes at an upper end and a lower end of the operating housing, and is retained in each of the first position-limiting structure installation holes via a first spring and a first thread plug, and a front end of the first pin cooperates with the first position-limiting protruding portion of the inner shifting shaft.

4. The transmission operating mechanism according to claim 1, wherein the inner shifting shaft is provided with a second position-limiting protruding portion, and a second pin is installed in the second position-limiting structure installation hole of the operating housing, and is retained in the second position-limiting structure installation hole via a second spring and a second bolt, and a front end of the second pin cooperates with the second position-limiting protruding portion of the inner shifting shaft.

5. The transmission operating mechanism according to claim 1, wherein a balancing spring configured to cooperate with the inner shifting shaft is installed in the balancing spring installation cavity.

6. The transmission operating mechanism according to claim 1, wherein an outer wall of the outer shifting shaft is provided with a groove, and a position-limiting steel ball roller is installed in the operating housing via a third spring and a third thread plug and is protruding into the groove in the outer wall of the outer shifting shaft.

7. The transmission operating mechanism according to claim 1, wherein the operating housing is provided with a neutral gear detecting device installation hole and a reverse gear detecting device installation hole.

8. The transmission operating mechanism according to claim 7, wherein a neutral gear detecting device is installed in the neutral gear detecting device installation hole, and a reverse gear detecting device is installed in the reverse gear detecting device installation hole.

9. The transmission operating mechanism according to claim 1, wherein a gear-selecting shaft is installed in the operating housing, and a gear-selecting shifting block is installed on the gear-selecting shaft; and the gear-selecting shifting block is configured to cooperate with the shifting block.

* * * * *